I. MARTIN.
DIFFERENTIAL AXLE.
APPLICATION FILED APR. 22, 1919.

1,394,855.

Patented Oct. 25, 1921.

INVENTOR.
ISAAC MARTIN
BY A. B. Bowman
ATTORNEY

UNITED STATES PATENT OFFICE.

ISAAC MARTIN, OF SAN DIEGO, CALIFORNIA.

DIFFERENTIAL AXLE.

1,394,855.   Specification of Letters Patent.   Patented Oct. 25, 1921.

Application filed April 22, 1919. Serial No. 291,832.

*To all whom it may concern:*

Be it known that I, ISAAC MARTIN, a citizen of the United States, residing at San Diego, in the county of San Diego and State of California, have invented a certain new and useful Differential Axle, of which the following is a specification.

My invention relates to an axle made in parts so constructed that either end may revolve faster than the other for making up the difference in the distance the wheels travel in going around curves and the like and the objects of my invention are: first, to provide an axle for railway cars and vehicles of all classes so constructed that either end of the axle may revolve faster than the other; second, to provide an axle of this class in which the two members are permitted to revolve relatively to each other but in which there is no end play or movement; third, to provide an axle structure of this class which is so constructed that the parts for holding the two members of the axle together can not loosen or get out of order; fourth, to provide a new and novel key mechanism for supporting the two members of the axle in their relative positions and fifth, to provide a device of this class which is very simple and economical of construction, durable, easy to install and which will not readily deteriorate or get out of order.

Figure 1:
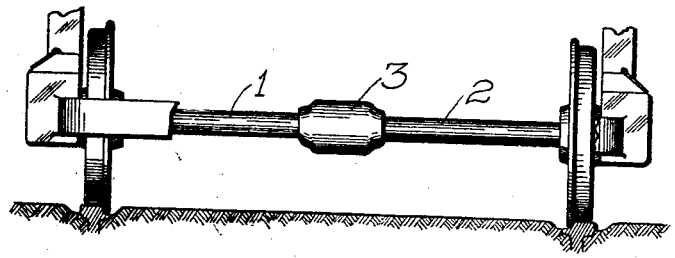
Figure 2:
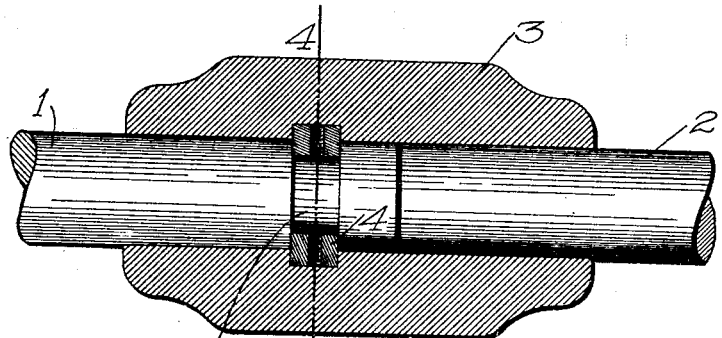
Figure 3:
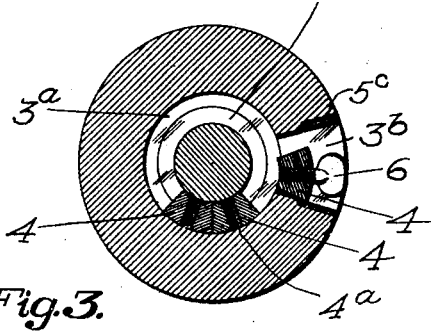
Figure 4:
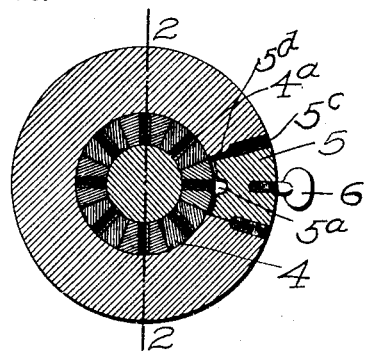
Figure 5:
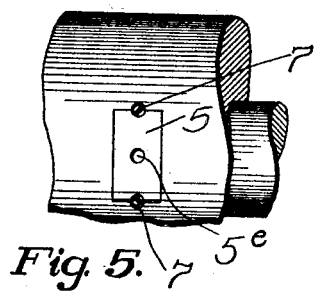

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my axle shown mounted on the wheels of a car; Fig. 2 is a sectional view through 2—2 of Fig. 4 showing some of the parts in elevation to facilitate the illustration; Fig. 3 is a sectional view through 4—4 of Fig. 2 showing the plug 5 removed and showing one of the key sections 4 being inserted in position; Fig. 4 is a similar sectional view showing the plug and all of the key sections in position and Fig. 5 is a side elevational view of a fragmentary portion of the axle and coupling showing the plug 5 in position.

Similar characters of reference refer to similar parts and portions throughout the several views of the drawings.

The axle members 1 and 2, coupling member 3, key sections 4, plug 5, wing screw 6 and lock screws 7 constitute the principal parts and portions of my axle structure.

The axle members 1 and 2 when placed end to end form an axle of the conventional form and size and are secured to the vehicle wheel in the conventional manner. Secured on the axle member 2 and extending over the end thereof is a coupling member 3 which is preferably swetted into position thereon or it may be made an integral portion of the axle member 2, and revolubly mounted in the opposite end of this coupling member 3 is the inner end of the axle member 1, this axle member 1 is provided with an annular groove $1^a$ therein and conforming therewith, and positioned in alinement therewith is a groove $3^a$ in the coupling member 3 and communicating with the grooves $1^a$ and $3^a$ is a tapered aperture $3^b$ extending therefrom as shown best in Figs. 3 and 4 of the drawings, this aperture $3^b$ is of sufficient size and properly formed to admit the key sections 4 to be inserted therein so that they close the grooves $1^a$ and $3^a$ in the axle member 1 and the coupling member 3. These key sections are properly formed to fill these grooves as shown best in Figs. 3 and 4 of the drawings and each is provided with a central hole $4^a$ therein which is threaded, adapted for the wing screw 6 as shown best in Fig. 3. These holes $4^a$ are for the purpose of performing the double function of an oil conductor to the inner side of the groove $1^a$ and as a means to assist in removing the sections 4 through the aperture $3^b$. After the sections 4 are placed in position as shown in Fig. 4 of the drawings, a plug 5 is inserted in the aperture $3^b$ which fills said aperture completely the inner end being shaped to conform with the outer surface of the sections 4 as shown best in Figs. 3 and 4 of the drawings. This plug 5 is provided with a recess $5^a$ therein and communicating with said recess and with the inner end of the threaded hole $5^c$ is a channel $5^d$, this is for the purpose of conducting oil to the recess $5^a$ from the threaded hole $5^c$ which communicates with the outside. The plug 5 is also provided with a threaded hole adapted for the wing screw 6 for removing the plug by inserting said screw therein.

This plug 5 is secured in position by means of a pair of lock screws 7 oppositely disposed in said plug and the member 3 for forming a lock for securing said plug in position.

It will be noted that the inner ends of the axle members 1 and 2 are spaced slightly to provide clearance for the revoluble movement of one relatively to the other.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction there is provided a differential vehicle axle in which one end will readily revolve relatively to the other, that there is provided safe and secure means for preventing longitudinal movement of one axle member to the other, that there is provided means for lubricating the annular key formed by the members 4, that there is provided means for holding said key members in position which is securely locked to prevent them loosening or getting out of order.

Having thus described my invention what I claim as new and desire to secure by Letters Patent, is:

1. An axle of the class described, including a pair of axle members of equal diameter placed end to end in alinement, the one provided with an annular rectangular groove therein, a coupling member with its one end rigidly secured to the other of said axle members and provided with an annular rectangular groove registering with the annular rectangular groove in said axle member and with a rectangularly shaped inwardly converging walled aperture therein extending from the outside to said groove for admitting a key in sections and an annular rectangular key formed of a plurality of sections so shaped as to completely fill the space formed by the annular rectangular grooves in said axle and said coupling for preventing longitudinal movement of said axle members relatively to each other but permitting revoluble movement, each section provided with a threaded hole therein to facilitate its removal.

2. An axle of the class described, including a pair of axle members of equal diameter placed end to end in alinement, the one provided with an annular rectangular groove therein, a coupling member with its one end rigidly secured to the other of said axle members and provided with an annular rectangular groove registering with the annular rectangular groove in said axle member and with a rectangularly shaped inwardly converging walled aperture therein extending from the outside to said groove for admitting a key in sections and an annular rectangular key formed of a plurality of sections so shaped as to completely fill the space formed by the annular rectangular grooves in said axle and said coupling for preventing longitudinal movement of said axle members relatively to each other but permitting revoluble movement, each section provided with a threaded hole therein to facilitate its removal and a plug conforming to the rectangularly shaped inwardly converging walled aperture in said coupling adapted to fill said aperture and means for securing it in said aperture so that its outer surface is flush with said coupling.

3. An axle of the class described, including a pair of axle members of equal diameter placed end to end in alinement, the one provided with an annular rectangular groove therein, a coupling member with its one end rigidly secured to the other of said axle members and provided with an annular rectangular groove registering with the annular rectangular groove in said axle member and with a rectangularly shaped inwardly converging walled aperture therein extending from the outside to said groove for admitting a key in sections and an annular rectangular key formed of a plurality of sections so shaped as to completely fill the space formed by the annular rectangular grooves in said axle and said coupling for preventing longitudinal movement of said axle members relatively to each other but permitting revoluble movement, each section provided with a threaded hole therein to facilitate its removal and a plug conforming to the rectangularly shaped inwardly converging walled aperture in said coupling adapted to fill said aperture and means for securing it in said aperture so that its outer surface is flush with said coupling, provided with a central threaded hole therein and a key member common to the holes in said plug and said key section adapted to facilitate the removal of either said plug or said key section.

In testimony whereof, I have hereunto set my hand at San Diego, California, this 16th day of April, 1919.

ISAAC MARTIN.